United States Patent
Brown et al.

(10) Patent No.: US 9,251,230 B2
(45) Date of Patent: Feb. 2, 2016

(54) EXCHANGING LOCATIONS OF AN OUT OF SYNCHRONIZATION INDICATOR AND A CHANGE RECORDING INDICATOR VIA POINTERS

(71) Applicant: International Business Machines Corporation, Armonk, NY (US)

(72) Inventors: Theresa M. Brown, Tucson, AZ (US); Theodore T. Harris, Jr., Tucson, AZ (US); Mark L. Lipets, Tucson, AZ (US); Carol S. Mellgren, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/654,041

(22) Filed: Oct. 17, 2012

(65) Prior Publication Data
US 2014/0108345 A1    Apr. 17, 2014

(51) Int. Cl.
*G06F 17/30* (2006.01)
*G06F 11/20* (2006.01)
*G06F 11/14* (2006.01)

(52) U.S. Cl.
CPC ...... *G06F 17/30575* (2013.01); *G06F 11/1446* (2013.01); *G06F 11/2082* (2013.01); *G06F 17/30174* (2013.01)

(58) Field of Classification Search
None
See application file for complete search history.

(56) References Cited

U.S. PATENT DOCUMENTS

| | | | |
|---|---|---|---|
| 5,522,037 A | 5/1996 | Kitagawa et al. | |
| 5,742,792 A * | 4/1998 | Yanai et al. | 711/162 |
| 7,188,222 B2 | 3/2007 | Micka et al. | |
| 7,539,892 B2 | 5/2009 | Jean-Denis et al. | |
| 7,734,883 B2 | 6/2010 | Spear et al. | |
| 7,818,522 B2 | 10/2010 | Bartfai et al. | |
| 8,121,007 B2 | 2/2012 | Nagar et al. | |
| 8,539,122 B2 | 9/2013 | Biehler et al. | |
| 2003/0170012 A1* | 9/2003 | Cochran | 386/125 |
| 2004/0260899 A1 | 12/2004 | Kern et al. | |
| 2005/0071586 A1 | 3/2005 | Bartfai et al. | |
| 2005/0071589 A1 | 3/2005 | Tross et al. | |
| 2005/0071710 A1* | 3/2005 | Micka et al. | 714/6 |
| 2005/0081091 A1 | 4/2005 | Bartfai et al. | |
| 2011/0208694 A1 | 8/2011 | Bitar et al. | |

(Continued)

FOREIGN PATENT DOCUMENTS

| | | |
|---|---|---|
| CN | 102347897 | 2/2012 |
| CN | 102354293 | 2/2012 |
| JP | 2003173240 | 6/2003 |

OTHER PUBLICATIONS

U.S. Appl. No. 14/070,226, filed Nov. 1, 2013.
(Continued)

*Primary Examiner* — Alex Gofman
*Assistant Examiner* — Umar Mian
(74) *Attorney, Agent, or Firm* — Rabindranath Dutta; Konrad Raynes Davda & Victor LLP

(57) ABSTRACT

A first data structure stores indications of storage locations that need to be copied for forming a consistency group. A second data structure stores indications of new host writes, subsequent to starting a point in time copy operation to form the consistency group. Locations of the first data structure and the second data structure are exchanged, subsequent to the consistency group being formed successfully.

12 Claims, 8 Drawing Sheets

(56) References Cited

U.S. PATENT DOCUMENTS

2012/0078848 A1  3/2012  Jennas, II et al.
2012/0221823 A1  8/2012  Benhase et al.

OTHER PUBLICATIONS

PCT international search report and written opinion dated Mar. 25, 2014 for Serial No. PCT/IB2013/058875 filed Sep. 26, 2013.
English translation of JP2003173240.
Office Action dated Jun. 2, 2014, pp. 41, for U.S. Appl. No. 13/654,053, filed Oct. 17, 2012.
Response dated Sep. 2, 2014, pp. 13, to Office Action dated Jun. 2, 2014, pp. 41, for U.S. Appl. No. 13/654,053, filed Oct. 17, 2012.
Office Action dated Jul. 3, 2014, pp. 33, for U.S. Appl. No. 13/654,053, filed Oct. 17, 2012.
Final Office Action dated Oct. 2, 2014, pp. 40, for U.S. Appl. No. 13/654,053, filed Oct. 17, 2012.
Response dated Oct. 3, 2014, p. 13, to Office Action dated Jul. 3, 2014, pp. 33, for U.S. Appl. No. 13/654,053, filed Oct. 17, 2012.
RCE Response dated Dec. 31, 2014, pp. 15, to Final Office Action dated Oct. 2, 2014, pp. xx, for U.S. Appl. No. 13/654,053, filed Oct. 17, 2012.
Response dated May 28, 2015, pp. 13, to Office Action dated Mar. 5, 2015, pp. 47, for U.S. Appl. No. 13/654,053.
Response dated Apr. 30, 2015, pp. 9, to Final Office Action dated Jan. 30, 2015, pp. 42, for U.S. Appl. No. 14/070,226.
Notice of Allowance dated May 19, 2015, pp. 12, for U.S. Appl. No. 14/070,226.
Notice of Allowance dated Jun. 12, 2015, pp. 12, for U.S. Appl. No. 13/654,053.
"Maintaining Consistency Groups with Space Efficient Volumes", IP.com PriorArtDatabase, Technical Disclosure, IP.com No. IPCOM000211741D, Oct. 14, 2011, pp. 1-5.
US Application filed Oct. 17, 2012, by inventors, M.T. Benhase, T.M. Brown, and M.L. Lipets.
Final Office Action, dated Jan. 30, 2015, for U.S. Appl. No. 14/070,226, filed Nov. 1, 2013, invented by Michael T. Benhase et al., Total 42 Pages.
Office Action, dated Mar. 5, 2015, for U.S. Appl. No. 13/654,053, filed Oct. 17, 2012, invented by Michael T. Benhase et al., Total 47 Pages.
Tang, et al., "Fast Differential Backup Method", abstract, Computer Engineering, vol. 34, Issue 11, pp. 255-257, Jun. 2008.
PCT International Search Report and written opinion dated Apr. 3, 2014 for Serial No. PCT/IB2013/058876 filed Sep. 26, 2013.
English translation of CN102347897 Feb. 8, 2012.
English translation of CN102354293 Feb. 15, 2012.
U.S. Pat. No. 8,539,122 is the English language counterpart of Chinese Patent CN102347897.
U.S. Appl. No. 14/876,724, filed Oct. 6, 2015.
U.S. Appl. No. 14/876,726, filed Oct. 6, 2015.

* cited by examiner

EXCHANGING LOCATIONS OF AN OUT OF SYNCHRONIZATION INDICATOR AND A CHANGE RECORDING INDICATOR VIA POINTERS

BACKGROUND

1. Field

The disclosure relates to a method, system, and article of manufacture for exchanging locations of an out of synchronization indicator and a change recording indicator via pointers.

2. Background

Certain mirroring mechanisms provide data replication over extended distances between two sites for disaster recovery. If adequate bandwidth exists, such mirroring mechanisms may provide a recovery point objective of as low as 3-5 seconds or less between the two sites at extended distances, with no performance impact on the application at the primary site. Certain mirroring mechanisms may copy the data asynchronously and also forms a consistency group at a regular interval, allowing a clean recovery of data.

Certain mirroring mechanisms may pause updates of the primary volumes and then use a bitmap to drain updates from the primary volumes to the secondary volumes at the remote site. After all primary updates have been drained, the secondary volumes are used as the source for a point in time copy to tertiary volumes at the recovery site. This ensures that the tertiary copy of the volumes has a point-in-time consistency. By grouping many volumes into a single session, multiple volumes may be copied to the recovery site simultaneously, while maintaining point-in-time consistency across those volumes.

Such mirroring mechanisms can control the formation of consistency groups for data consistency. A consistency group is a collection of volumes across multiple storage units that are managed together when creating consistent copies of data. The order of dependent writes is preserved in consistency groups. The formation of these consistency groups may be controlled by a primary storage unit, which sends commands over remote mirror and copy volumes to remote storage units.

SUMMARY OF THE PREFERRED EMBODIMENTS

Provided are a method, a system, and a computer program product in which a first data structure stores indications of storage locations that need to be copied for forming a consistency group. A second data structure stores indications of new host writes, subsequent to starting a point in time copy operation to form the consistency group. Locations of the first data structure and the second data structure are exchanged, subsequent to the consistency group being formed successfully.

In further embodiments, the first data structure is an out of synchronization bitmap, and the second data structure is a change recording bitmap.

In additional embodiments, a change recording bitmap pointer and an out of synchronization bitmap pointer are maintained. The change recording bitmap pointer is pointed to the out of synchronization bitmap and the out of synchronization bitmap pointer is pointed to the change recording bitmap to perform the exchanging.

In additional embodiments, the consistency group is formed by successfully performing during a start increment phase for all volumes in a session, the recording of host writes in the change recording bitmap and the draining out of the out of synchronization bitmap. Additionally, during an increment completion phase the recording of host writes is stopped and the exchanging is performed.

In yet additional embodiments, a remote copy operation of primary volumes of a primary computational device to secondary volumes of a remote computational device is performed. A point in time copy operation of the secondary volumes of the remote computational device to tertiary volumes of the remote computational device is also performed.

In further embodiments, no merging of contents of the first data structure to the second data structure is performed.

In still further embodiments, the first data structure and the second data structure are maintained in a bitmap metadata track, wherein the exchanging is performed via pointers maintained in a non-volatile metadata track.

In yet further embodiments, the first and the second data structure are bitmaps.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Exemplary Embodiments

Figure 1:
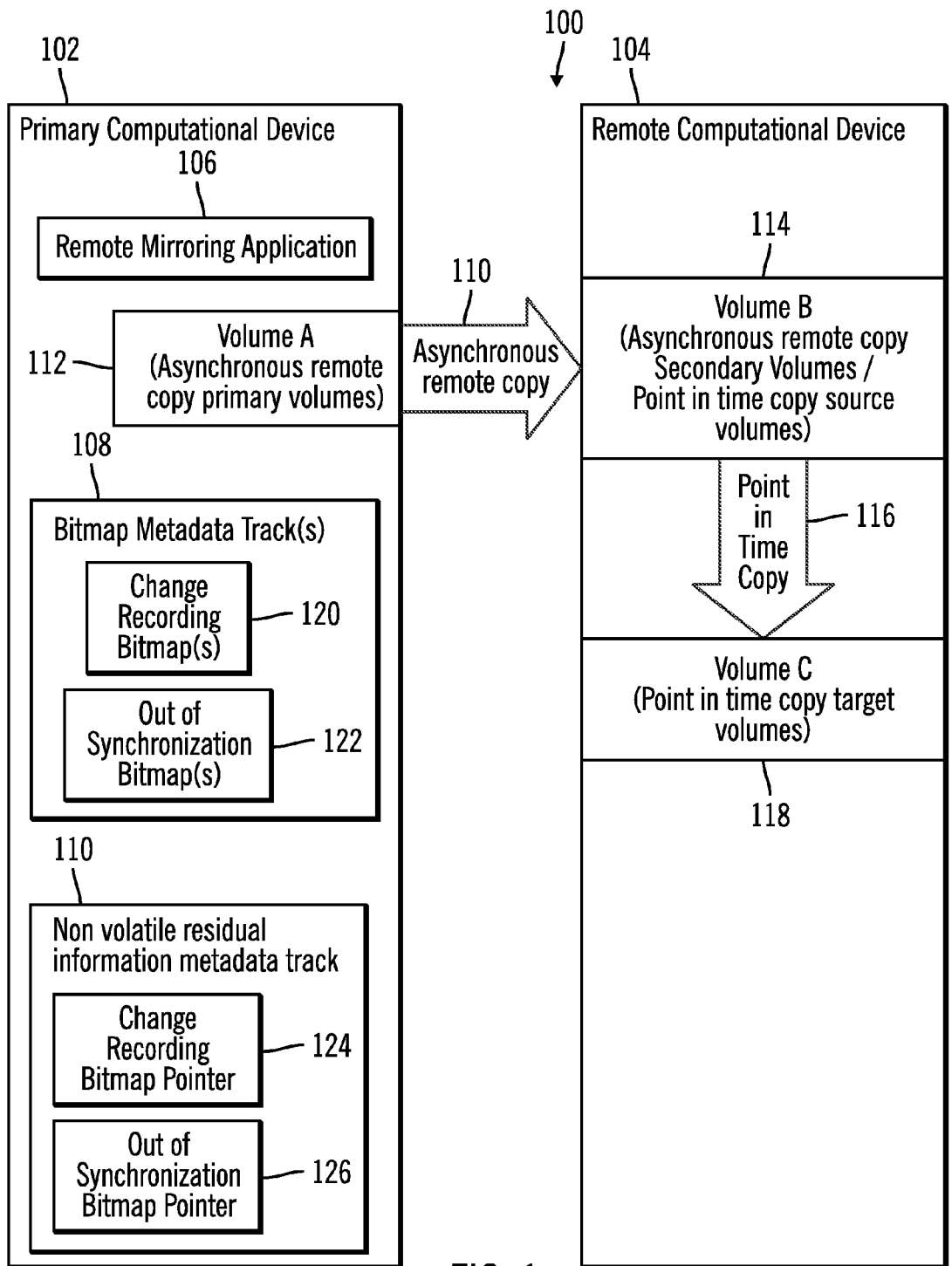
FIG. 1 illustrates a block diagram of a computing environment that includes a primary computational device and a remote computational device, in accordance with certain embodiments.

FIG. 1 illustrates a block diagram of a computing environment 100 that includes a primary computational device 102 and a remote computational device 104, in accordance with certain embodiments.

The primary computational device 102 and the remote computational device 104 may comprise any suitable computation device, such as, a server, a personal computer, a storage controller, a controller, a blade computer, a telephony device, a mainframe computer, etc. The primary computational device 102 and the remote computational device 104 may be coupled over a network, such as the Internet, an intranet, a storage area network, etc. The primary computational device 102 and the remote computational device 104 may be coupled to one or more storage devices via an interface.

The primary computational device 102 and the remote computational device 104 may receive commands from one or more host computational devices that desire access to data controlled by the primary computational device 102 and the remote computational device 104.

The primary computational device 102 may include a remote mirroring application 106, bitmap metadata tracks 108, and non volatile residual information metadata tracks 110. In certain embodiments, under the control of the remote mirroring application 106, asynchronous remote copy operations 110 are performed to asynchronously copy exemplary volume A 112 (i.e., a storage volume) maintained by the primary computational device 102 to the exemplary volume B 114 maintained by the remote computational device 104. The exemplary volume A 112 may also be referred to as an asynchronous remote copy primary volume, and a plurality of such volumes may be controlled via the primary computational device 102. The exemplary volume B 114 may also be referred to as an asynchronous remote copy secondary volume, and a plurality of such volumes may be controlled via the remote computational device 104.

In certain embodiments, point in time copy operations 116 are performed to create point in time copies (i.e., a consistent copy at an instant of time) of volume B 114 to volume C 118. Volume B 114 which is an asynchronous remote copy secondary volume may also be a point in time copy source volume, and volume C 118 may comprise a point in time copy target volume. A plurality of volumes similar to volume B 114 or volume C 118 may be controlled by the remote computational device 104.

When a volume is created, bitmap metadata tracks 108 are allocated for copy services use for the remote mirroring application 106. The number of bitmap metadata tracks allocated may depend on the number of customer tracks on the volume. In certain embodiments, each bitmap metadata track includes a plurality of data fields that may be indexed sequentially. The same data field on every bitmap metadata track may represent the same bitmap. In other words, that one bitmap is scattered across all bitmap metadata tracks occupying the same data field on each track. When a bitmap (such as the change recording bitmap 120 or the out of synchronization bitmap 122) is allocated, a unique field/bitmap index that corresponds to the bitmap is assigned. The information about the bitmap index is currently used by each process is kept in the non-volatile residual information metadata track 110. The information may be maintained via a change recording bitmap pointer 124 and an out of synchronization bitmap pointer 126.

Therefore, FIG. 1 illustrates a computing environment 100 in which asynchronous remote copy and point in time copy operations are performed by using change recording bitmaps 120 and out of synchronization bitmaps 122 to generate consistency groups.

Figure 2:
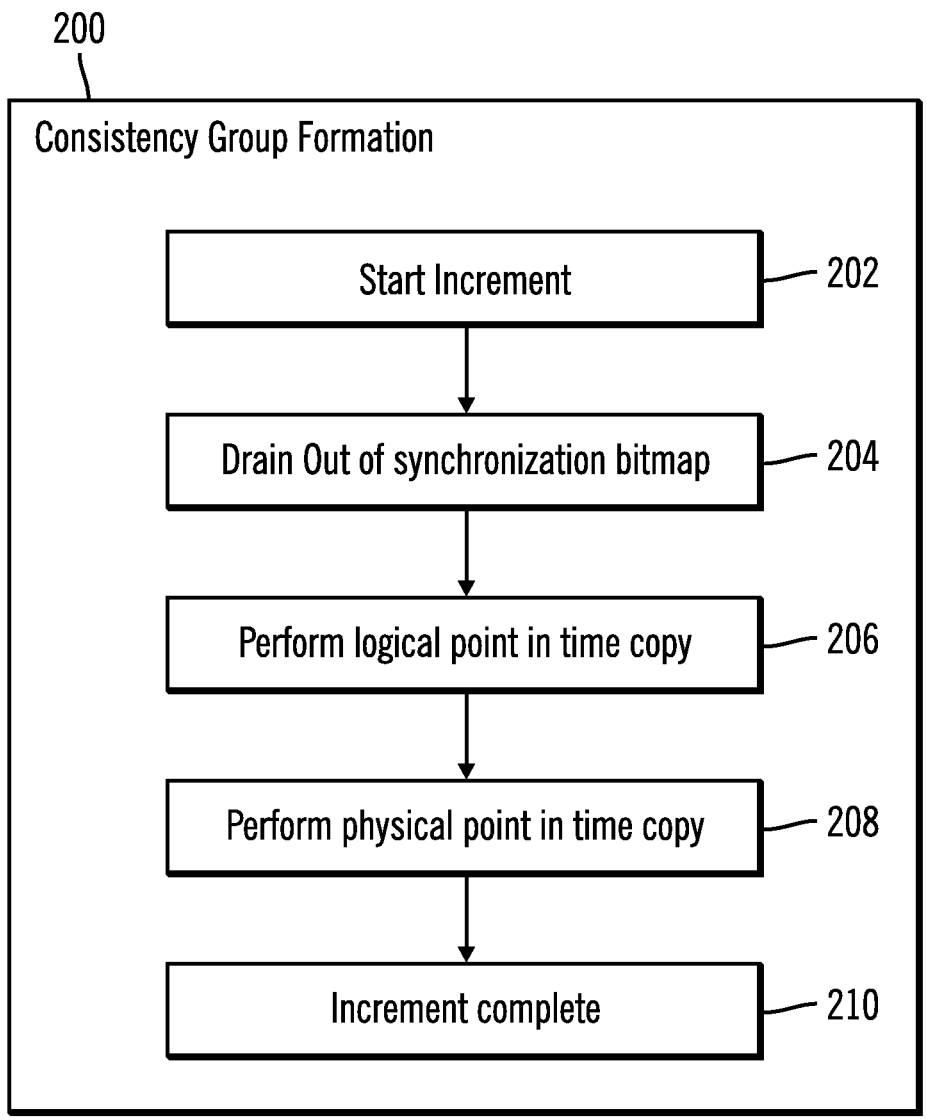
FIG. 2 illustrates a block diagram that shows consistency group formation, in accordance with certain embodiments.

FIG. 2 illustrates a block diagram 200 that shows consistency group formation, in accordance with certain embodiments. The operations shown in block diagram 200 may be performed by the computational devices 102 and 104 in the computing environment 100.

In certain embodiments, consistency group formation in the computing environment 100 that performs remote mirroring is comprised of the following operations as shown in block 200:

1. Start Increment (block 202);
2. Drain out of synchronization bitmap (block 204);
3. Perform logical point in time copy (block 206);
4. Perform physical point in time copy (block 208); and
5. Increment Complete (block 210).

When these operations 202, 204, 206, 208, 210 have completed successfully for all the volumes in a session, this is considered a successful consistency group formation.

In the start increment phase (block 202), change recording is started for all volumes in the session. New host writes are recorded in the change recording bitmap 120 instead of the out of synchronization bitmap 122. All tracks marked for asynchronous remote copy in the out of synchronization bitmap 122 are transferred (at block 204) to the remote site 104. Once the out of synchronization bitmap 122 has been drained (i.e., all bits that were set to 1 to indicate that the corresponding track has to be consistently copied to the remote computational device 104 have been set to 0), the logical and physical point in time copies can be made (at blocks 206, 208).

If the point in time copies are successful, then this is considered a successful consistency group. If at any time one of the steps is not completed successfully, the consistency group is considered failed and the point in time copy relationship is reverted. During increment complete (at block 210), the change recording is stopped and host writes are recorded, again in the out of synchronization bitmap 122. In certain situations, this transition may take place in a time consuming way by merging the contents of the change recording bitmap 120 into the out of synchronization bitmap 122 and stopping change recording. This type of merge operation may be time consuming as it may have to merge all bits in the bitmap for all tracks in the volume. It also increases the number of modified metadata tracks in cache. Every bitmap metadata track may be modified in cache.

In certain embodiments, a failover may comprise an event in which a system in an exemplary cluster may automatically switch over to one or more backup nodes in the event of a failure of a node. In certain embodiments, a central electronics complex (CEC) failover may occur, in which if one CEC fails, then the system performs a failover to another CEC. In such types of failover situations, every lost metadata track may have to be recovered by setting all the bits in the out of synchronization bitmap 122. Additional bits set in the out of synchronization bitmap 122 may cause unnecessary transfers from the primary computational device to the remote computational device. Additionally such merge operations may have scalability issues with large volumes. As volumes get larger, they have more bitmap tracks that may become too large in size for efficient handling. Certain embodiments provide a more efficient way of handling the transition, by stopping the change recording and recording the host writes once again in the out of synchronization bitmap 122 without performing any merge operations.

Figure 3:
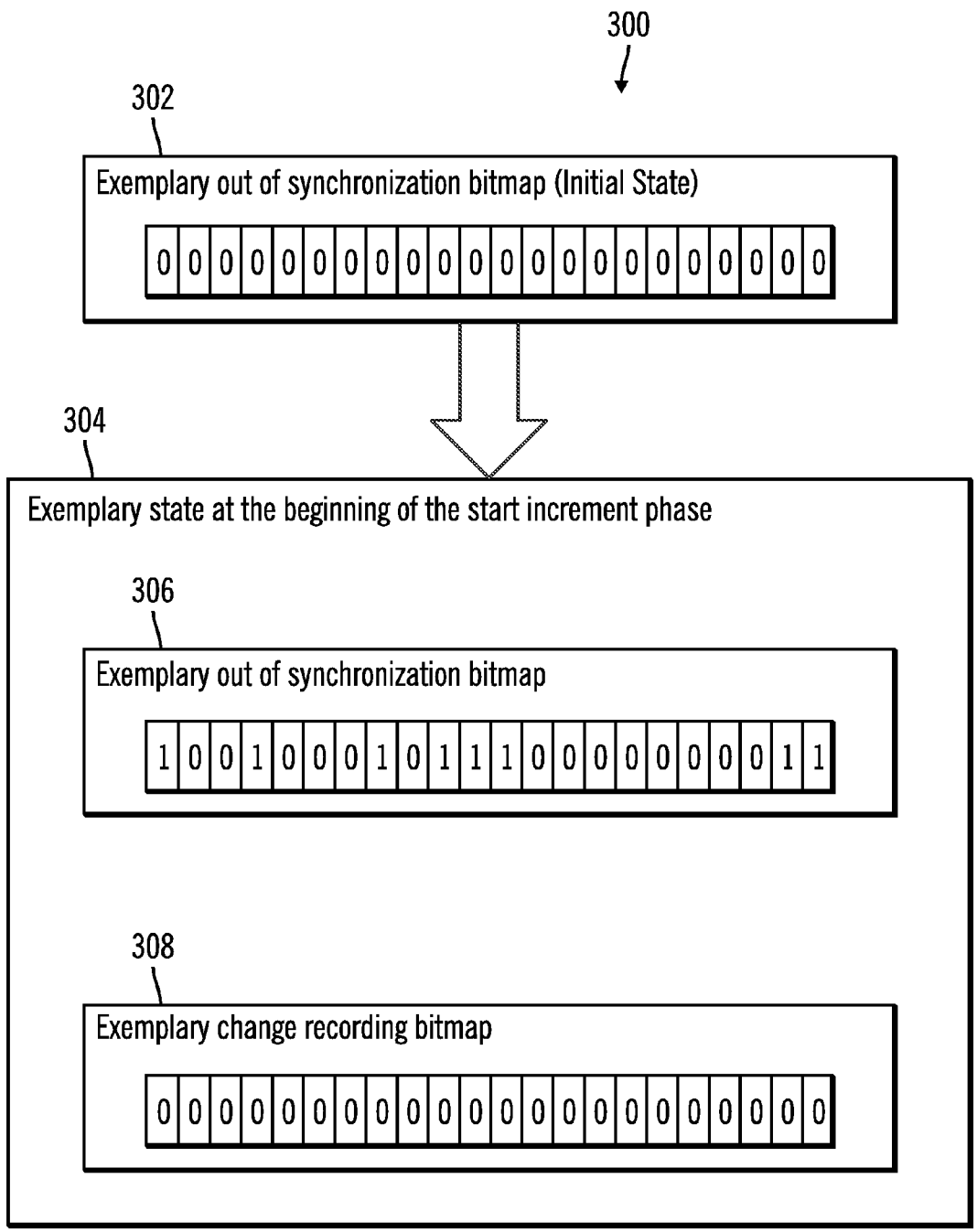
FIG. 3 illustrates a block diagram that shows states of certain bitmaps, in accordance with certain embodiments.

FIG. 3 illustrates a block diagram 300 that shows states of certain bitmaps, in accordance with certain embodiments. An exemplary out of synchronization bitmap 302 is shown in an initial state in which all bits are set to 0, i.e., no tracks remain to be consistently copied from the primary computational device 102 to the remote computational device 104.

Block 304 shows the state of an exemplary out of synchronization bitmap 306 and an exemplary change recording bitmap 308 at the beginning of the start increment phase 202 of FIG. 2. In such a state, the exemplary change recording bitmap 308 has all bits set to 0 and the exemplary out of synchronization bitmap has at least some bits set to 1 to indicate tracks that have yet to be asynchronously copied to the remote computational device 104 from the primary computational device 102.

Figure 4:
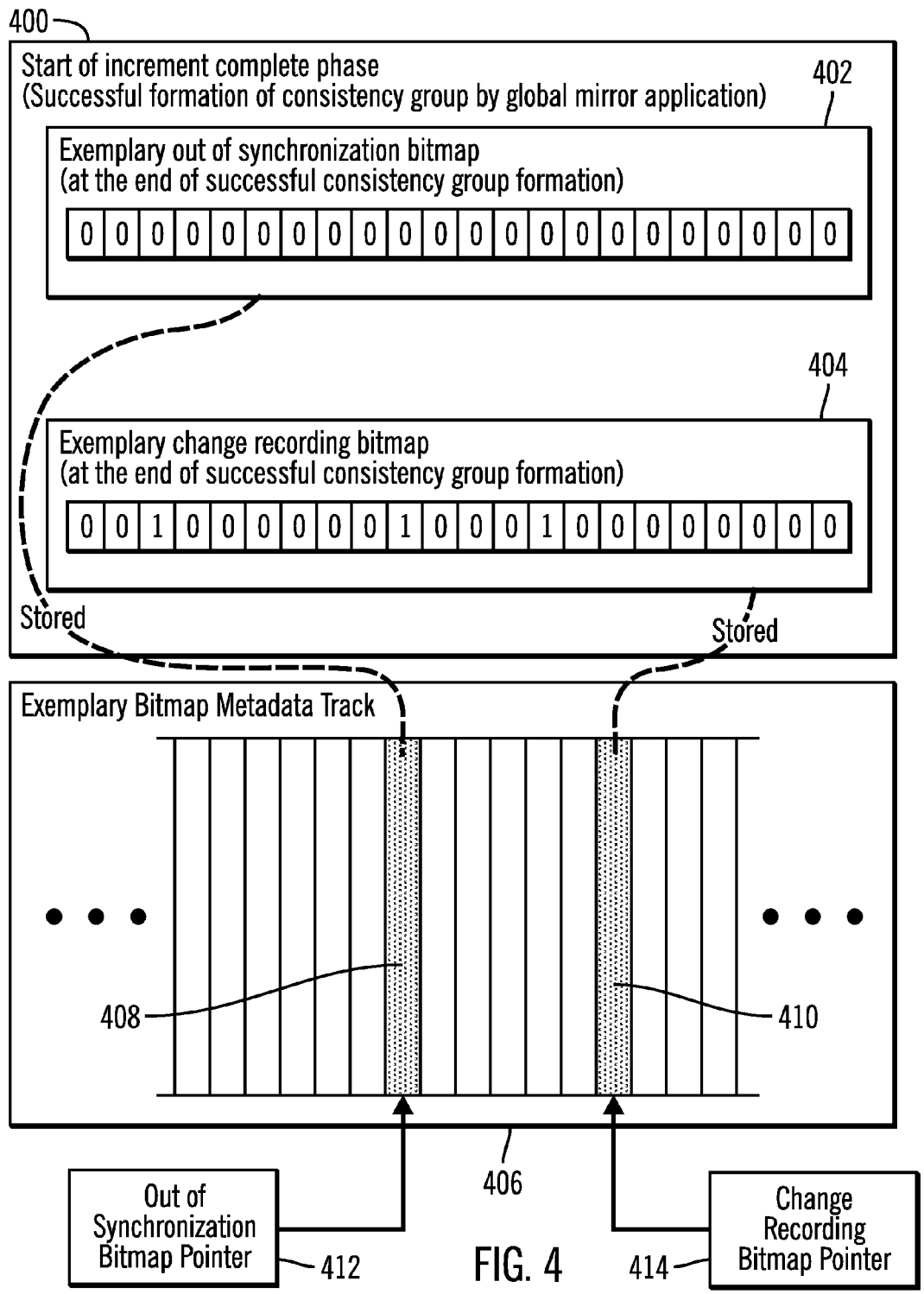
FIG. 4 illustrates a block diagram that shows states of certain bitmaps at the start of increment complete phase, in accordance with certain embodiments.

FIG. 4 illustrates a block diagram 400 that shows states of certain bitmaps at the start of the increment complete phase, in accordance with certain embodiments. The state of bitmaps shown in FIG. 4 is at the successful conclusion of the point in time copy operations 206, 208 to generate consistency groups.

In the state shown in FIG. 4, the bits of the exemplary out of synchronization bitmap 402 are set to all 0, as all tracks have been copied over to the remote computational device 104, i.e., the out of synchronization bitmap 306 has been drained. As a track is transferred, the corresponding bit in the out of synchronization bitmap 306 is changed from 1 to 0.

In FIG. 4, the exemplary change recording bitmap 404 has at least some bits set to 1, to indicate tracks modified by host writes during the point in time copy operations.

FIG. 4 also shows an exemplary bitmap metadata track 406, in which at location 408 the out of synchronization bitmap 402 is stored. Furthermore, at location 410 the change recording bitmap 404 is stored.

FIG. 4 also shows that the out of synchronization bitmap pointer 412 points at location 408 of the exemplary bitmap metadata track 406 and the change recording bitmap pointer 414 points to location 410 of the bitmap metadata track 406.

Figure 5:
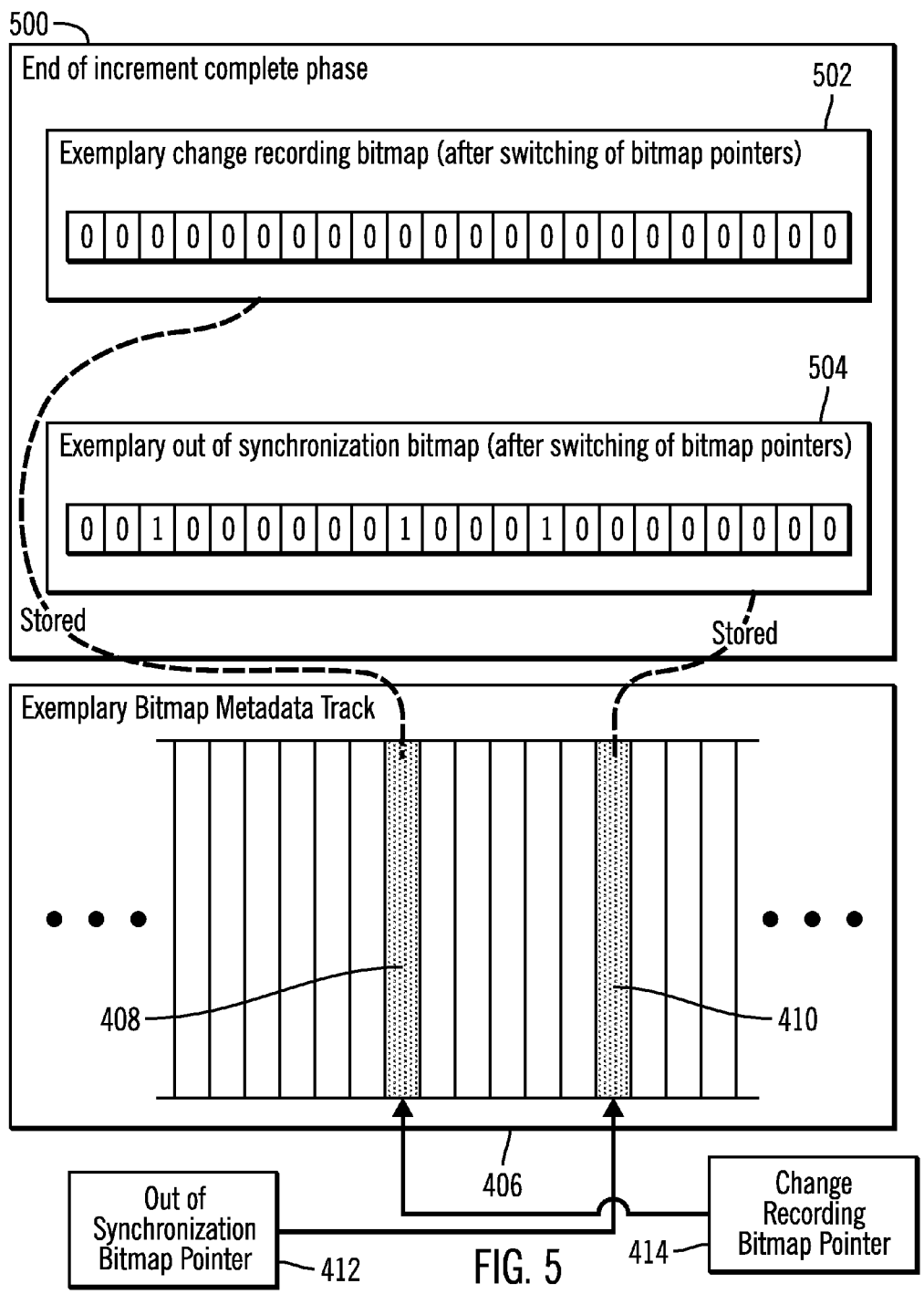
FIG. 5 illustrates a block diagram that shows states of certain bitmaps at the end of increment complete phase, in accordance with certain embodiments.

FIG. 5 illustrates a block diagram 500 that shows states of certain bitmaps after switching of bitmap pointers at the end of the increment complete phase 210, in accordance with certain embodiments. Rather than merging the change recording bitmap 404 to the out of synchronization bitmap 402, in FIG. 5 the out of synchronization bitmap pointer 412 is made to point to location 410 (instead of location 408 as in FIG. 4), and the change recording bitmap pointer 414 is made to point to location 408 (instead of location 410 as in FIG. 4). As a result, the change recording bitmap 502 is all zeros (as the bitmap stored in location 408 is all zeros as shown in FIG. 4. The exemplary out of synchronization bitmap 504 is stored in location 410, and has at least some bits that are 1, and has to be drained.

Therefore, in certain embodiments, when a remote mirroring session successfully forms a consistency group, an out of synchronization bitmap will be all zeros. The end result of the merging of change recording bitmap into the out of synchronization bitmap is the same as copying the change recording bitmap into the out of synchronization bitmap (the merging of change recording bitmap into the out of synchronization bitmap may also be referred to as a merger of bitmaps). Instead of performing the merge, the bitmap pointers can be modified so that now the out of synchronization bitmap pointer is pointing to the old change recording bitmap. The advantages of switching the bitmap pointers is that almost no time is required, and the increment complete is faster, which means lower recovery point objective. There is no impact on the cache, and the embodiments can be implemented with any volume size. In view of the switching of the bitmap pointer, there is no added time required for very large volumes, i.e., irrespective of the volume size, the switching of the bitmap pointers take the same amount of time.

Therefore, by swapping pointers, merger of the bitmaps are avoided and the change recording bitmap is swapped with the out of synchronization bitmap and the process shown in block 200 can start once again.

Figure 6:
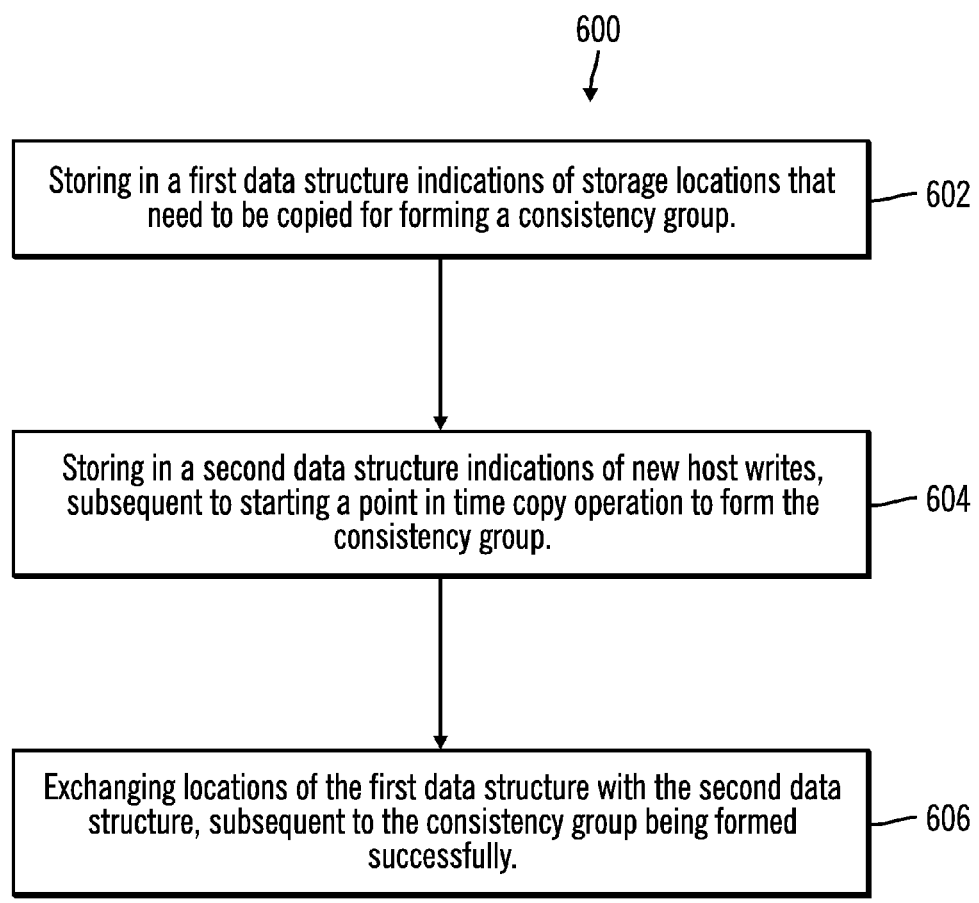
FIG. 6 illustrates a first flowchart that shows operations performed in the computing environment, in accordance with certain embodiments.

FIG. 6 illustrates a first flowchart 600 that shows operations performed in the computing environment 100, in accordance with certain embodiments. The operations shown in FIG. 6 may be performed via the primary computational device 102 and the remote computational device 104.

Control starts at block 602, in which a first data structure (e.g., the out of synchronization bitmap 122) stores indications of storage locations that need to be copied for forming a consistency group. A second data structure (e.g., the change recording bitmap 120) stores (at block 604) indications of new host writes, subsequent to starting a point in time copy operation to form the consistency group. Locations of the first data structure are exchanged (at block 606) with the second data structure, subsequent to the consistency group being formed successfully.

Figure 7:
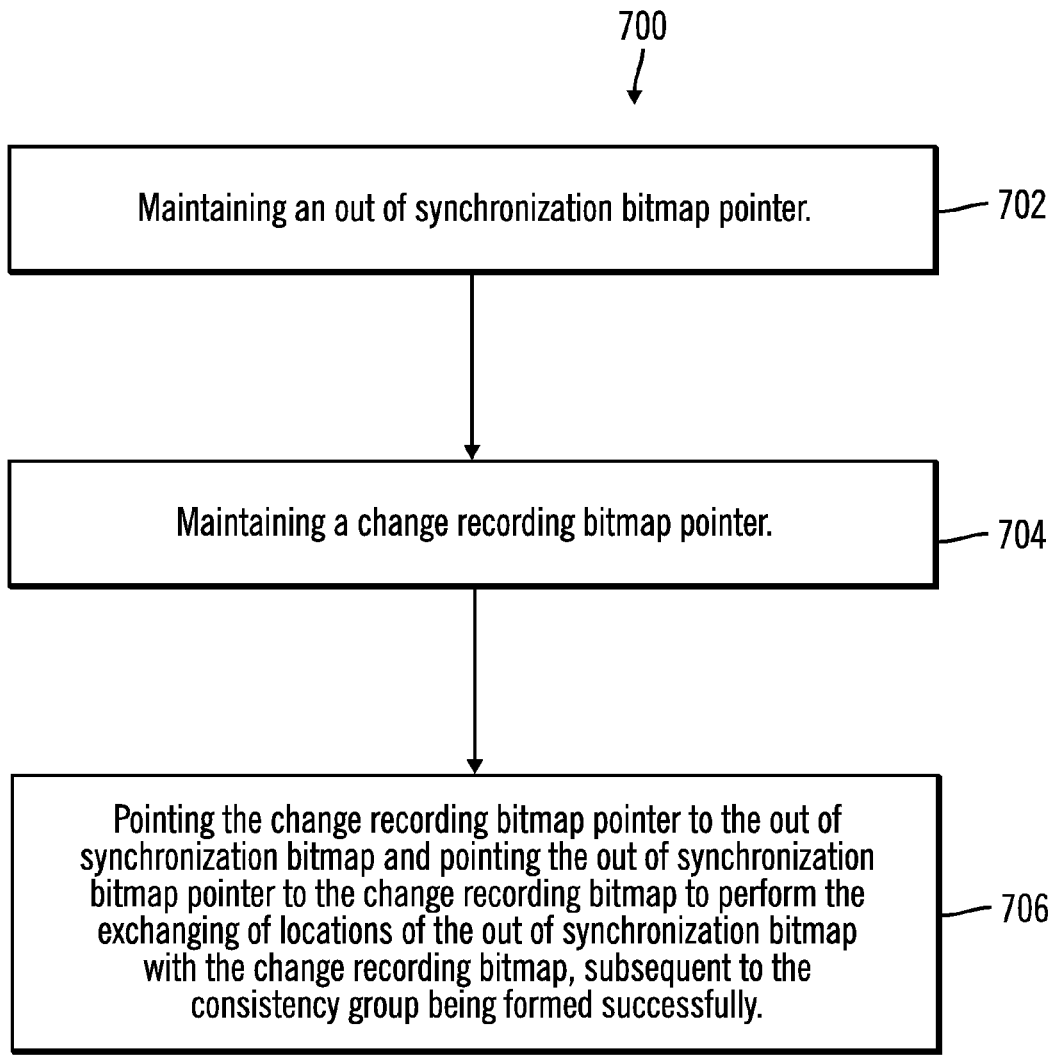
FIG. 7 illustrates a second flowchart that shows operations performed in the computing environment, in accordance with certain embodiments.

FIG. 7 illustrates a second flowchart 700 that shows operations performed in the computing environment 100, in accordance with certain embodiments. The operations shown in FIG. 7 may be performed via the primary computational device 102 and the remote computational device 104.

Control starts at block 702 in which an out of synchronization bitmap pointer 126 is maintained. Control proceeds to block 704 in which a change recording bitmap pointer 124 is maintained. The change recording bitmap pointer 124 is pointed to the out of synchronization bitmap and the out of synchronization bitmap pointer 126 is pointed to the change recording bitmap to perform the exchanging of locations of the out of synchronization bitmap with the change recording bitmap, subsequent to a consistency group being formed successfully.

Therefore, FIGS. 1-7 illustrate certain embodiments, in which by swapping pointers instead of performing a merger, the process of exchanging a change recording bitmap 120 with an out of synchronization bitmap 122 is speeded up and uses less processor time.

In certain embodiments, as part of the remote mirroring setup, a remote copy pair may be established. During this establish, an out of synchronization bitmap is allocated. The bitmap index assigned to out of synchronization is saved in a non-volatile residual information metadata. When change recording is started, a bitmap is allocated. The bitmap index assigned to change recording is saved in the non-volatile residual information metadata. When remote mirroring successfully forms a consistency group, it is known that out of synchronization bitmap does not have any bits set and change recording bitmap contains information about new host "writes" that came during consistency group formation. In certain embodiments, instead of a bitmap merger, the bitmap index assigned to out of synchronization is exchanged with the bitmap index assigned to change recording.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
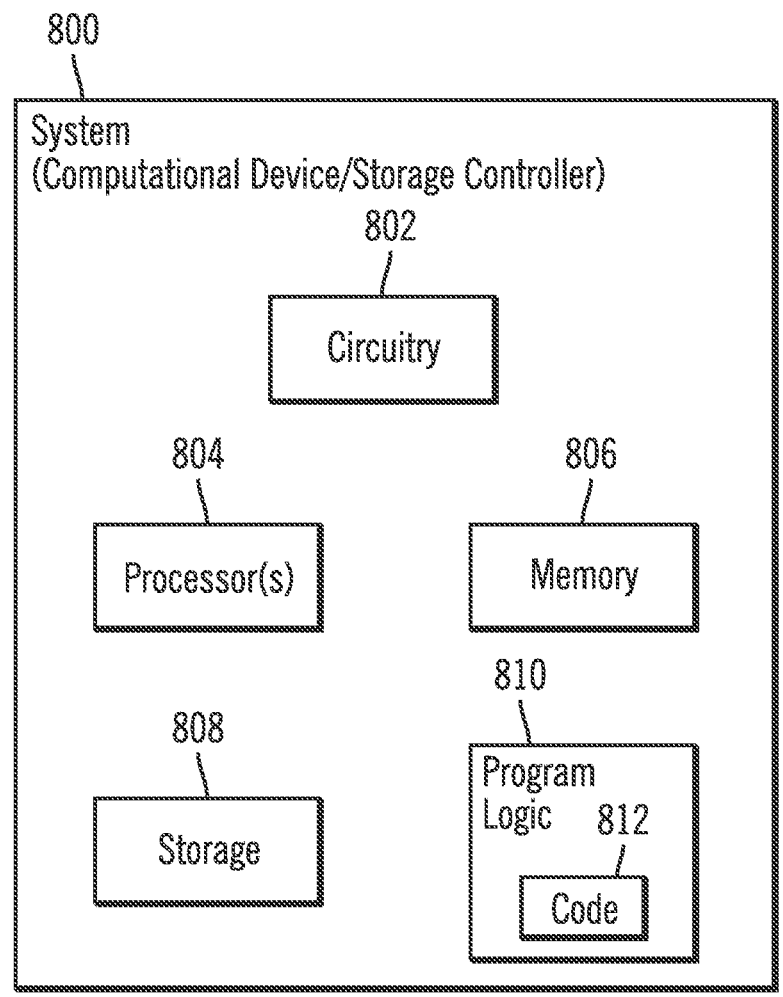
FIG. 8 illustrates a block diagram of a computational system that shows certain elements that may be included in at least the computational devices of FIG. 1, in accordance with certain embodiments.

FIG. 8 illustrates a block diagram that shows certain elements that may be included in the computational devices 102, 104 in accordance with certain embodiments. The system 800 may comprise the computational devices 102, 104 and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present inventions)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing in an out of synchronization bitmap indications of storage locations that need to be copied for forming a consistency group, wherein an out of synchronization bitmap pointer stored in a non-volatile metadata track controlled by a primary computational device points to the out of synchronization bitmap;
   storing in a change recording bitmap indications of new host writes, subsequent to starting a point in time copy operation to form the consistency group, wherein a change recording bitmap pointer stored in the non-volatile metadata track points to the change recording bitmap, wherein the out of sychronization bitmap is stored is a first location of a bitmap metadata track and the change recording bitmap is stored in a second location of the bitmap metadata track, wherein the first location and the second location have intervening locations that separate the first location and the second locations in the bitmap metadata track, wherein the bitmap metadata track is controlled by a primary computational device from which an asynchronous remote copy is performed to a remote computational device, and wherein the point in time copy operation to form the consistency group is performed in the remote computational device; and
   exchanging locations within the bitmap metadata track of the out of synchronization bitmap with the change recording bitmap by pointing the change recording bitmap pointer stored in the non-volatile metadata track to the first location that stores the out of synchronization bitmap from second location that stores the change recording bitmap, and by pointing the out of synchronization bitmap pointer stored in the non-volatile metadata track to the second location that stores the change recording bitmap from the first location that stores the out of synchronization bitmap, subsequent to the consistency group being formed successfully, wherein no merging of contents of the out of synchronization bitmap with the change recording bitmap is performed.

2. The method of claim 1, wherein the consistency group is formed by successfully performing:
   during a start increment phase for all volumes in a session, the recording of host writes in the change recording bitmap;
   draining the out of synchronization bitmap; and
   during an increment completion phase stopping the recording of host writes and performing the exchanging.

3. The method of claim 1, the method further comprising:
   performing a remote copy operation of primary volumes of a primary computational device to secondary volumes of a remote computational device; and
   performing a point in time copy operation of the secondary volumes of the remote computational device to tertiary volumes of the remote computational device.

4. A system, the system comprising:
   a memory; and
   a processor coupled to the memory, wherein the processor performs operations, the operations comprising:
   storing in an out of synchronization bitmap indications of storage locations that need to be copied for forming a consistency group, wherein an out of synchronization bitmap pointer stored in a non-volatile metadata track controlled by a primary computational device points to the out of synchronization bitmap;
   storing in a change recording bitmap indications of new host writes, subsequent to starting a point in time copy operation to form the consistency group, wherein a change recording bitmap pointer stored in the non-volatile metadata track points to the change recording bitmap, wherein the out of synchronization bitmap is stored is a first location of a bitmap metadata track and the change recording bitmap is stored in a second location of the bitmap metadata track, wherein the first location and the second location have intervening locations that separate the first location and the second locations in the bitmap metadata track, wherein the bitmap metadata track is controlled by a primary computational device from which an asynchronous remote copy is performed to a remote computational device, and wherein the point in time copy operation to form the consistency group is performed in the remote computational device; and
   exchanging locations within the bitmap metadata track of the out of synchronization bitmap with the change recording bitmap by pointing the change recording bitmap pointer stored in the non-volatile metadata track to the first location that stores the out of synchronization bitmap from second location that stores the change recording bitmap, and by pointing the out of synchronization bitmap pointer stored in the non-volatile metadata track to the second location that stores the change recording bitmap from the first location that stores the out of synchronization bitmap, subsequent to the consistency group being formed successfully, wherein no merging of contents of the out of synchronization bitmap with the change recording bitmap is performed.

5. The system of claim 4, wherein the consistency group is formed by successfully performing:
   during a start increment phase for all volumes in a session, the recording of host writes in the change recording bitmap;
   draining the out of synchronization bitmap; and
   during an increment completion phase stopping the recording of host writes and performing the exchanging.

6. The system of claim 4, the operations further comprising:
   performing a remote copy operation of primary volumes of a primary computational device to secondary volumes of a remote computational device; and
   performing a point in time copy operation of the secondary volumes of the remote computational device to tertiary volumes of the remote computational device.

7. A computer program product, the computer program product comprising a non-transitory computer readable storage medium having computer readable program code embodied therewith, the computer readable program code configured to perform operations, the operations comprising:
   storing in an out of synchronization bitmap indications of storage locations that need to be copied for forming a consistency group, wherein an out of synchronization bitmap pointer stored in a non-volatile metadata track controlled by a primary computational device points to the out of synchronization bitmap;
   storing in a change recording bitmap indications of new host writes, subsequent to starting a point in time copy operation to form the consistency group, wherein a change recording bitmap pointer stored in the non-volatile metadata track points to the change recording bitmap, wherein the out of synchronization bitmap is stored is a first location of a bitmap metadata track and the change recording bitmap is stored in a second location of the bitmap metadata track, wherein the first location and the second location have intervening locations that separate the first location and the second locations in the bitmap metadata track, wherein the bitmap metadata track is controlled by a primary computational device from which an asynchronous remote copy is performed to a remote computational device, and wherein the point in time copy operation to form the consistency group is performed in the remote computational device; and
   exchanging locations within the bitmap metadata track of the out of synchronization bitmap with the change recording bitmap by pointing the change recording bitmap pointer stored in the non-volatile metadata track to the first location that stores the out of synchronization bitmap from second location that stores the change recording bitmap, and by pointing the out of synchronization bitmap pointer stored in the non-volatile metadata track to the second location that stores the change recording bitmap from the first location that stores the out of synchronization bitmap, subsequent to the consistency group being formed successfully, wherein no merging of contents of the out of synchronization bitmap with the change recording bitmap is performed.

8. The computer program product of claim 7, wherein the consistency group is formed by successfully performing:
   during a start increment phase for all volumes in a session, the recording of host writes in the change recording bitmap;
   draining the out of synchronization bitmap; and
   during an increment completion phase stopping the recording of host writes and performing the exchanging.

9. The computer program product of claim 7, the operations further comprising:
   performing a remote copy operation of primary volumes of a primary computational device to secondary volumes of a remote computational device; and
   performing a point in time copy operation of the secondary volumes of the remote computational device to tertiary volumes of the remote computational device.

10. A controller comprising a primary computational device coupled to one or more storage devices and a remote computational device, the controller comprising:
    an interface to couple the one or more storage devices to the controller;
    a memory coupled to the interface;
    a processor coupled to the memory, wherein the processor performs operations, the operations comprising:
    storing in an out of synchronization bitmap indications of storage locations that need to be copied for forming a consistency group, wherein an out of synchronization bitmap pointer stored in a non-volatile metadata track controlled by the primary computational device points to the out of synchronization bitmap;
    storing in a change recording bitmap indications of new host writes, subsequent to starting a point in time copy operation to form the consistency group, wherein a change recording bitmap pointer stored in the non-volatile metadata track points to the change recording bitmap, wherein the out of synchronization bitmap is stored is a first location of a bitmap metadata track and the change recording bitmap is stored in a second location of the bitmap metadata track, wherein the first location and the second location have intervening locations that separate the first location and the second locations in the bitmap metadata track, wherein the bitmap metadata track is controlled by a primary computational device from which an asynchronous remote copy is performed to a remote computational device, and wherein the point in time copy operation to form the consistency group is performed in the remote computational device; and
    exchanging locations within the bitmap metadata track of the out of synchronization bitmap with the change recording bitmap by pointing the change recording bitmap pointer stored in the non-volatile metadata track to the first location that stores the out of synchronization bitmap from second location that stores the change recording bitmap, and by pointing the out of synchronization bitmap pointer stored in the non-volatile metadata track to the second location that stores the change recording bitmap from the first location that stores the out of synchronization bitmap, subsequent to the consistency group being formed successfully, wherein no merging of contents of the out of synchronization bitmap with the change recording bitmap is performed.

11. The controller of claim 10, wherein the consistency group is formed by successfully performing:
    during a start increment phase for all volumes in a session, the recording of host writes in the change recording bitmap;
    draining the out of synchronization bitmap; and
    during an increment completion phase stopping the recording of host writes and performing the exchanging.

12. The controller of claim 10, the operations further comprising:
- performing a remote copy operation of primary volumes of a primary computational device to secondary volumes of a remote computational device; and
- performing a point in time copy operation of the secondary volumes of the remote computational device to tertiary volumes of the remote computational device.

\* \* \* \* \*